PROCESS FOR THE MANUFACTURING OF VANADIUM CHLORIDES

Ferdinand Langenhoff, 9 Mondorfer-str., 4 5211 Ranzel-Deutz, Germany; Erich Termin, 4 Kraftwerkweg, 7877 Laufenburg, Germany; Arnold Lenz, 7 Gerstenkamp, 5 Cologne-Stammheim, Germany; and Georg Schinke, 2 Feldmuhlestr., 5211 Ranzel, Germany
No Drawing. Filed Oct. 1, 1970, Ser. No. 77,331
Int. Cl. C01b 11/00
U.S. Cl. 423—472      4 Claims

ABSTRACT OF THE DISCLOSURE

Improvements in the production of vanadium chlorides and/or oxychlorides by the reductive chlorination of vanadium oxides with chlorine in the presence of carbon at elevated temperatures by carrying out the process in a tube reactor, the walls of which are lined with the product produced by flame-hardening or baking to 800 to 1000° C. a mixture of corundum and as a binder the water hydrolysis product of silicon and aluminum alcoholates made by the process disclosed in published German Pat. 1,286,038.

---

This invention relates to the process of reductively chlorinating vanadium oxide to vanadium chloride or vanadium oxychloride. It more particularly refers to a novel apparatus in which this process is carried out.

The manufacturing of vanadium chlorides, such as vanadium tetrachloride or vanadium oxychloride, is usually performed by reductive chlorination of vanadium oxide in the presence of carbon. Special problems are encountered in this process because the necessarily high working temperatures adversely affect the reactor lining material. It is obviously necessary to have reactors or reactor lining materials which are resistant to chlorine and carbon at these high temperatures.

Metallic reactors without linings have been found to be unsatisfactory because the metals are either attacked by chlorine or they corrode. Even nickel, which is in itself resistant to chlorine attacks, will, under the conditions of vanadium chloride and oxychloride preparation, show a noticeable loss of material and corrosion. Oxidic reactor lining materials, such as quartz, are theoretically suited to this use under these reaction conditions because they do not corrode and are relatively inert to chlorine. This type of reactor lining material is less than wholly satisfactory for industrial application due to the fact that vanadium oxide, because of its negative expansion coefficient during the temperature changes that may always occur in this process, will expand this kind of lining or the lined pipe systems and therefore damage such, often beyond repair.

It is therefore an object of this invention to provide an improved process of producing vanadium chloride or vanadium oxychloride.

It is another object of this invention to provide a novel reactor for this process.

Other and additional objects of this invention will become apparent from a consideration of this entire specification, including the claims hereof.

In accord with and fulfilling these objects, one aspect of this invention is an improvement in the process of producing vanadium chlorides by reductive chlorination by carrying out this process in tube reactors of nickel or stainless steel which are lined with a special ceramic material. This special lining material is the direct flame-hardened product of a pourable mixture of fine-grained corundum and as a binder water hydrolyzed silicon aluminum ester made according to published German application 1,186,-038, which has been diluted with a solvent. The reaction zone of this invention is made by filling the space between the reactor wall and a suitable inner casing with the corundum-binder mixture, preferably after first removing the solvent component by evaporation or the like, and then hardening such by direct flame action or baking at temperatures of 800–1000° C.

In the process of hydrolyzing the silicon and aluminum alcoholates for use in this invention, it sometimes is desirable to include titanium alcoholates in the composition in order to regulate the hydrolysis speed. Such additional titanium values may be carried through the whole process into the reactor lining product.

The preferred solvents are $C_1$ to $C_4$ alkyl alcohols and ketones such as acetone or methylethyl ketone. Preferred alcoholate moieties are $C_2$ to $C_4$ alkyl alcohols.

It is essential to the improvements obtained according to this invention that a smooth and compact surface especially the surface directed towards the reaction space, be produced on the reactor lining. Indeed, the reactor lining must have a reaction directed surface and an inner structure that is particularly free from pores in order to resist corrosion thereof and of the metal backing tube by the chlorine, oxygen and carbon in the reaction mixture. Neither sufficiently limited porosity, compact surface, elasticity nor adequate chemical resistance is obtained with the conventional refractory ceramic materials.

The mixture from which the reactor lining of this invention is made comprises 75 to 85 weight percent corundum, 8.3 to 5 weight percent hydrolyzed silicon and aluminum alcoholates, and 16.7 to 10 weight percent solvent. Solvent removal is suitably accomplished by heating to 600 to 900° C. for 12 to 6 hours.

The corundum suitably has a grain size of 0.1 to 30$\mu$.

The flame used in flame hardening is suitably caused by burning propane or ethane or mixtures thereof. This flame burns at about 800 to 1000° C. The hardening should be carried out for 6 to 12 hours.

EXAMPLE 1

In a nickel or VA-steel pipe with the following dimensions: inside $\phi$ 350 mm., height 2000 mm., a lining is made as follows:

Fine-grained aluminum oxide (to 30$\mu$) with a 33 percent by weight isopropyl alcohol solution of a condensed silicon aluminum ester produced from silicic acid ethyl ester and Al sec. butyl alcoholate in a mol ratio of 1:1 with 1 mol of $H_2O$ is thoroughly mixed in a mixer in a weight ratio of 80%:20% until a substance is obtained that is only just flowable. In the pipe serving as a reactor after being lined, a screening plate is inserted according to the desired inside dimensions, which plate is covered with filter paper and shaped at the top as a reversed funnel.

At the bottom there is a metal attachment closing off the hollow space. The latter is then filled up with the above substance. After 24–48 hours' drying of the pouring substance and draining of the excess binding agent, the screening plate is removed. Subsequently heating is performed to a temperature that should be above the subsequent reaction temperature, i.e., to about 800 to 900° C. The hardening can also be obtained through direct flame action. In so doing, optimum results are obtained as far as freedom from pores and surface hardness are concerned.

In the reactor lined in this manner the manufacturing of vanadium oxychloride at 500–700° C. was performed according to the following formula:

$$2V_2O_5 + 3C + 6Cl_2 = 4VOCl_3 + 3Cl_2$$

A processing period lasted about six weeks. Thereafter cooling was performed to normal temperature and a new processing period was started. After four production periods no signs of wear and tear whatsoever could be ascertained in the reactor lining material. The obtained product was free from aluminum and yellow colored. When aluminum is present there will be discoloration towards black.

EXAMPLE 2

In a reactor with the same lining as in Example 1, vanadium tetrachloride was manufactured at temperatures of 800–850° C., according to the equation:

$$V_2O_5 + 5C + 4Cl_2 = 2VCl_4 + 5CO$$

In a similar production period as in Example 1, no wear and tear of the reactor lining could be noted.

EXAMPLE 3

In a reactor with a lining according to the invention $VCl_2$ was manufactured through disproportionation according to the following equation:

$$2VCl_3 = VCl_2 + VCl_4$$

In this process the reactor was heated in a 24-hour cycle from room temperature to about 700° C. After a 30-cycle period the reactor lining was not affected and exhibited no cracks.

What is claimed is:

1. In the process of producing vanadium chlorides or vanadium oxychlorides by reductive chlorination of vanadium oxide with chlorine in the presence of carbon at elevated temperatures; the improvement which comprises carrying out said reaction in a tubular reaction zone whose inner surface comprises a heat hardened product produced by mixing pourable fine grain corundum with, as a binder, the partial water hydrolysis product of silicon and aluminum alcoholates and with a solvent; applying the mixture to the interior walls of a reactor; removing the solvent; and then heat-hardening said mixture at 800 to 1000° whereby to line the inner walls of said reactor with a liner consisting essentially of said corundum and a form of said silicon-aluminum product.

2. The improved process claimed in claim 1 wherein said mixture comprises 5 to 8.3% hyrolyzed silicon and aluminum alcoholate, 85 to 75% corundum and 10 to 16.7% solvent.

3. The improved process claimed in claim 2 wherein said solvent is a member selected from the group consisting of $C_2$ to $C_4$ alkyl alcohols, acetone and methyl ethyl ketone.

4. The improved process claimed in claim 2 wherein said alcoholate moiety is a $C_2$ to $C_4$ alkyl.

References Cited
UNITED STATES PATENTS

| | | | |
|---|---|---|---|
| 3,058,817 | 10/1962 | Irani | 23—87 X |
| 3,374,053 | 3/1968 | Krettler et al. | 23—21 |
| 3,330,627 | 7/1967 | McCormick et al. | 23—87 X |
| 2,849,293 | 8/1958 | Wendell et al. | |
| 3,547,832 | 12/1970 | Hass et al. | 106—65 X |

HERBERT T. CARTER, Primary Examiner

U.S. Cl. X.R.
423—492; 106—65